Sept. 29, 1964  R. H. FLYNN ETAL  3,151,199
CONTROL FOR SUPPLYING AIR TO A BLOWER LOAD
Filed May 23, 1960  2 Sheets-Sheet 1
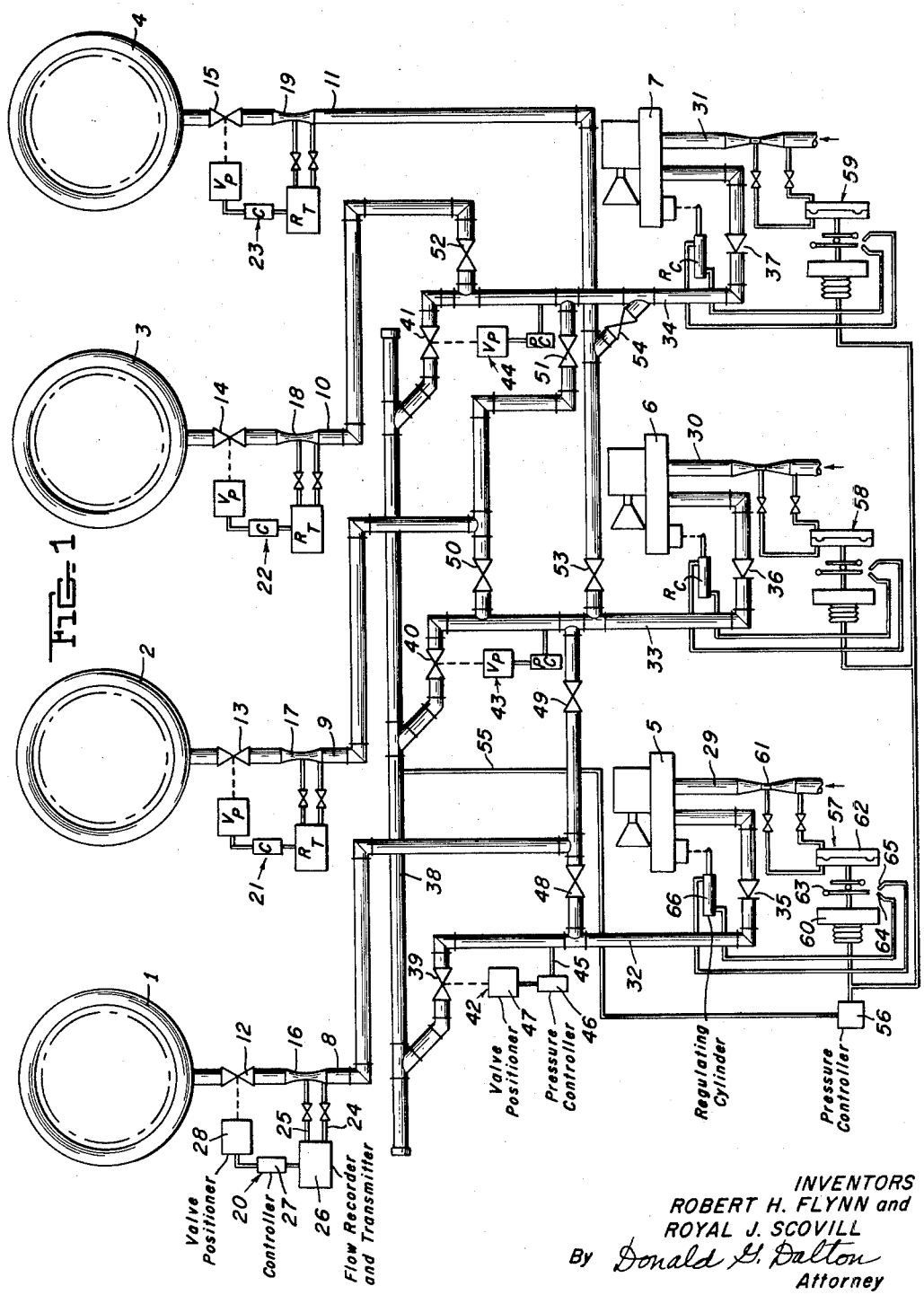
INVENTORS
ROBERT H. FLYNN and
ROYAL J. SCOVILL
By Donald G. Dalton
Attorney

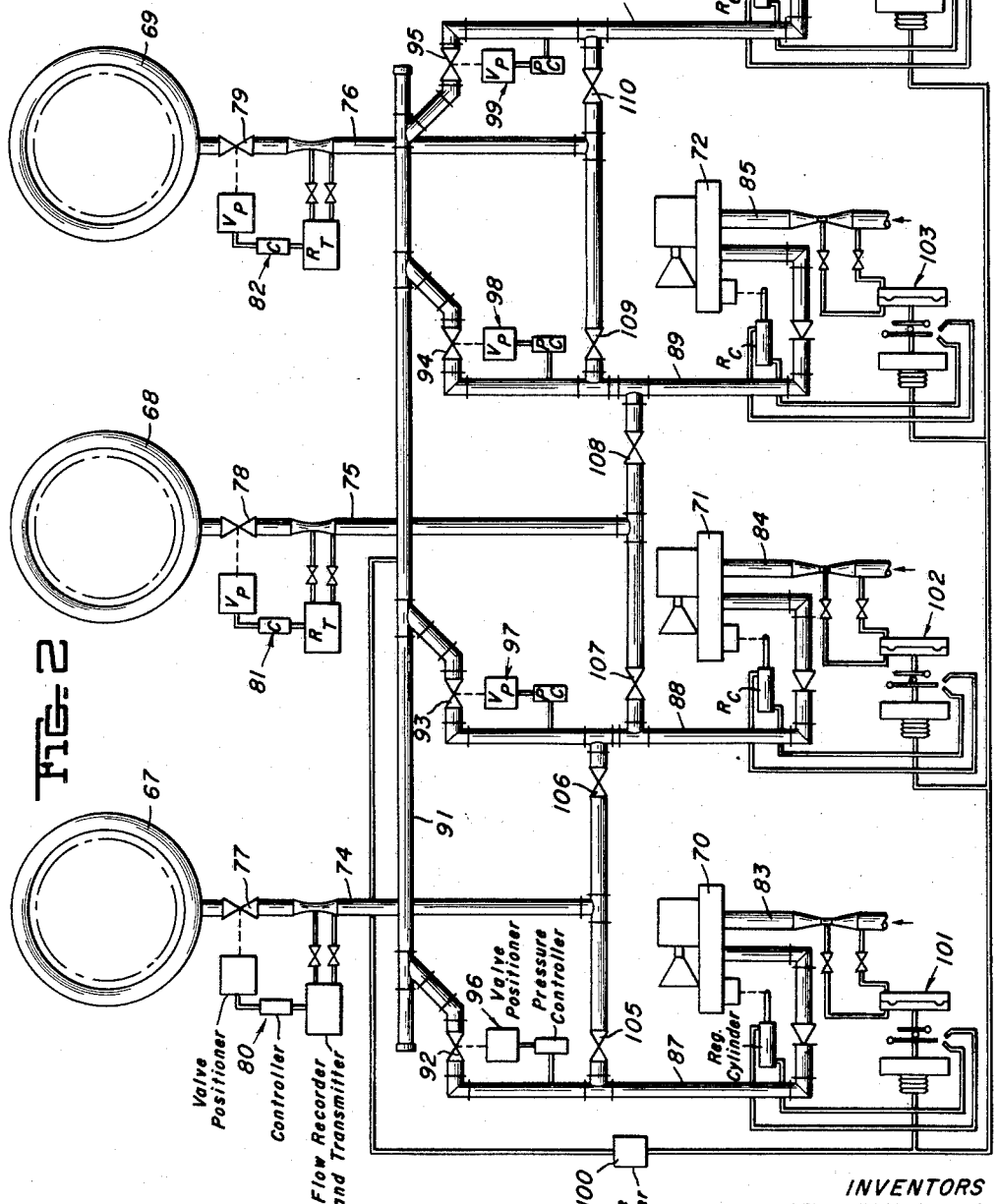

3,151,199
CONTROL FOR SUPPLYING AIR TO A BLOWER LOAD

Robert H. Flynn and Royal J. Scovill, Gary, Ind., assignors to United States Steel Corporation, a corporation of New Jersey
Filed May 23, 1960, Ser. No. 30,881
12 Claims. (Cl. 266—30)

This invention relates to a control for supplying air to a blower load and more particularly to supplying air to blast furnaces. Most plants producing pig iron have two or more blast furnaces to which air is supplied from one or more blowers such as turbo-blowers. Due to technical changes and other reasons the load requirements may change so that more blowers must be provided or air from one blower may be used to supply more than one blast furnace. Also, the load requirements; that is, the pressure and volume of air being supplied may vary from time to time in individual furnaces. Thus, in some instances a blower may be capable of supplying more air than one furnace requires and in other instances it may produce less air. Blowers, particularly turbo-blowers, operate more efficiently at near rated capacity than at low capacity.

It is therefore an object of our invention to provide an air control system wherein the blowers can operate at their best efficiency.

Another object is to provide such a control wherein a plurality of blowers are used to provide air to a plurality of blast furnaces with the air from any one of the blowers capable of being delivered to various furnaces.

Still another object is to provide such a control system which will permit any furnace in a group to be operated at a higher pressure than other furnaces in the group.

These and other objects will be more apparent after referring to the following specification and attached drawings, in which:

FIGURE 1 is a schematic view of a control system in which three turbo-blowers are used to deliver air to four blast furnaces; and FIGURE 2 is a similar view in which four turbo-blowers are used to deliver air to three blast furnaces.

Referring more particularly to FIGURE 1 of the drawings reference numerals 1, 2, 3 and 4 indicate blast furnaces to which air is supplied from turbo-blowers 5, 6 and 7. Air is supplied to furnaces 1, 2, 3 and 4 through conduits 8, 9, 10 and 11, respectively. Motor operated valves 12, 13, 14 and 15 are provided in the conduits 8, 9, 10 and 11 respectively. Venturis 16 17, 18 and 19 are provided in conduits 8, 9, 10 and 11, respectively. Valves 12, 13, 14 and 15 control the flow of air to the furnaces 1, 2, 3 and 4 by means of standard controls 20 21, 22 and 23. Since the controls are identical only control 20 will be described. The control 20 includes pressure taps 24 and 25 connected to opposite ends of the venturi 16. The taps 24 and 25 are connected to a standard flow recorder and transmitter 26. A flow signal from the transmitter 26 is impressed on a standard controller 27 which controls the position of valve 12 by means of a standard valve positioner 28.

Blowers 5, 6 and 7 are provided with inlets 29, 30 and 31 and outlet conduits 32, 33 and 34. Check valves 35, 36 and 37 are provided in conduits 32, 33 and 34, respectively. Conduits 32, 33 and 34 are connected to a spill header 38 through valves 39, 40 and 41, respectively. The positions of valves 39, 40 and 41 may be adjusted manually or by controls 42, 43 and 44, respectively. Since the controls are identical, only the parts of control 42 will be described. Control 42 includes a pressure tap 45 having one end connected to conduit 32 and the other end connected to a standard pressure controller 46 which operates a standard valve positioner 47.

Conduits 32 and 33 are connected to conduit 8 through valves 48 and 49. Conduits 33 and 34 are connected to conduit 9 through valves 50 and 51. Conduit 34 is connected to conduit 10 through valve 52. Conduits 33 and 34 are connected to conduit 11 through valves 53 and 54. A pressure tap 55 leads from spill header 38 to a standard pressure controller 56. A signal from controller 56 is transferred to individual controllers 57, 58 and 59 associated with turbo-blowers 5, 6 and 7, respectively. Since the controllers 57, 58 and 59 are identical only controller 57 will be described. This is shown as a well-known Askania flow regulator with a tap from controller 56 being connected to one side of a bellows 60 and taps from a venturi 61 in inlet 29 being connected to opposite sides of a diaphragm 62. The bellows 60 and diaphragm 62 are connected to move an oil jet 63 so as to position the jet 63 with respect to orifices 64 and 65. The orifices 64 and 65 are connected to a standard regulating cylinder 66 which regulates the speed of blower 5.

The operation of our control is as follows:

The controls 20, 21, 22 and 23 are set up to deliver the required amount of air to the furnaces 1, 2, 3 and 4, respectively. This is done by adjusting the flow controller 26. The pressure controller 56 is also adjusted to provide the desired pressure of air. If the air being delivered to furnace 1 varies from the set figure, the pressure differential across taps 24 and 25 will change, thus causing flow controller 27 to operate valve positioner 28 to open or close valve 12 until the preset amount of air is being delivered. A temporary set point loading on flow control 27 may be established to check the air on the furnace when casting or for any other purpose. If the pressure in the spill header 38 varies from the preset pressure the controller 56 transmits a signal to the regulators 57, 58 and 59. This master pressure is balanced in each of the regulators 57, 58 and 59 against a flow signal from intake pipes 29, 30 and 31. When the signals are out of balance the regulators 57, 58 and 59 will cause the speed controls 66 to adjust the speed of their respective turbo-blowers in a direction to cause the signals to come into balance. During this operation valves 39, 40 and 41 will be on manual control and open. Valves 48, 49, 50, 51, 52, 53 and 54 will all be open.

During the operation of the furnaces the condition of the burden in one of the furnaces may change to increase resistance to air flow so that the preset amount of air is not supplied even though the associated control valve 12, 13, 14 or 15 is in full open position. Thus, the operator knows that the system cannot supply the required air at the higher pressure. He therefore sets the controller 56 to a higher pressure so as to cause controls 57, 58 and 59 to increase the speed of the turbo-blowers and thus increase the pressure in the entire system.

If the air pressure requirement for furnace 1 increases a considerable amount above the pressure requirements for furnaces 2, 3 and 4 it would be expensive to increase pressure in the entire system. Therefore, instead of adjusting controller 56, the operator closes valve 49, puts valve 39 on automatic control and increases the pressure set point on pressure controller 46 to that desired for the conditions in furnace 1. This causes valve positioner 47 to start to close valve 39, which in turn backs up the pressure to turbo-blower 5 causing it to slow down. The slowing down of the turbo-blower decreases the flow through venturi 61 causing an upset in the balance of its flow regulator 57 so that regulating cylinder 66 increases the speed of the turbo-blower to supply the same volume of air as before, but at the elevated pressure so as to overcome the changed conditions in furnace 1. The total air requirements for furnace 1 is thus supplied from blower 5 with the remainder of any volume from turbo-blower 5 spilling through valve 39 into the spill header 38. Since the total volume of air required is still being supplied no pressure change occurs in the spill header 38 and the master pressure controller 56 makes no correction.

When the total air requirements decrease one or more of the valves 12, 13, 14 or 15 will move toward closed position and the pressure in spill header 38 will increase so that the signal from master pressure controller 56 will cause the controls 57, 58 and 59 to slow down the speeds of blowers 5, 6 and 7 so as to decrease the volume of delivered air. When the speeds of the blowers are decreased to a point where the total volume of air equals the new furnace requirements under the pressure condition required, the master pressure controller 56 will operate to maintain the turbo-blowers at their decreased speeds. While the invention has been described as applied to blast furnaces it will be understood that other loads such as a Bessemer converter may be substituted for one or more of the blast furnaces.

In the embodiment of our invention shown in FIGURE 2 three blast furnaces 67, 68 and 69 are supplied with air from four blowers 70, 71, 72 and 73. Air is supplied to furnaces 67, 68 and 69 through conduits 74, 75 and 76, respectively with control of air flow being provided by valves 77, 78 and 79 in conduits 74, 75 and 76, respectively. Controls 80, 81 and 82 control the flow of air through conduits 74, 75 and 76, respectively. These controls are the same as control 20 of the first embodiment. Blowers 70, 71, 72 and 73 are provided with inlets 83, 84, 85 and 86, respectively and outlet conduits 87, 88, 89 and 90, respectively. Conduits 87, 88, 89 and 90 are connected to a spill header 91 through valves 92, 93, 94 andd 95, respectively. The positioning of valves 92, 93, 94 and 95 is controlled by controls 96, 97, 98 and 99, respectively. These controls are the same as control 42 of FIGURE 1. As in the first embodiment pressure from header 91 is applied to a master pressure controller 100 corresponding to controller 56 of FIGURE 1. Also, as in the first embodiment, the master controller 100 is connected to flow regulators 101, 102, 103 and 104 associated with turboblowers 70, 71, 72 and 73, respectively. Conduits 87 and 88 are connected to conduits 74 through valves 105 and 106. Conduits 88 and 89 are connected to conduit 75 through valves 107 and 108, respectively. Conduits 89 and 90 are connected to conduits 76 through valves 109 and 110, respectively.

The operation of this embodiment of our invention is generally the same as that of the first embodiment. During normal operation valves 105, 106, 107, 108, 109 and 110 will be open with the flow to furnaces 67, 68 and 69 being controlled by the respective controls 80, 81 and 82. Master pressure controller 100 also operates in the same manner as in the first embodiment and valves 92, 93, 94 and 95 will be open and on manual control.

If the air pressure requirement for furnace 67 increases a considerable amount above the pressure requirements for furnaces 68 and 69 the operator closes valves 93 and 107, puts valve 92 on automatic control, and increases the pressure set point for control 96 to that desired for the conditions in furnace 67. This causes valves 92 to move toward closed position, which backs up the pressure to turbo-blowers 70 and 71 and causes them to slow down. This decreases the air flow from blowers 70 and 71 so that the flow regulators 101 and 102 increases the speeds of the turbo-blowers to supply the same volume of air as before, but at the elevated pressure necessary to overcome the changed condition in furnace 67. The total air requirements for furnace 67 is supplied from blowers 70 and 71 with the remainder spilling through valve 92 into the spill header 91. Since the total volume of air required is still being supplied no pressure change occurs in the spill header 91 and the master pressure controller 100 makes no correction. In a similar manner if the pressure requirements of furnace 68 increases air will be supplied thereto at the required higher pressure from blowers 71 and 72 and if the pressure requirements of furnace 69 increases air will be supplied thereto at the required higher pressure from blowers 72 and 73.

In each of the two embodiments described above it is possible to modify the operation during the time that one of the furnaces is being supplied with air at increased pressure. For example, if furnace 1 is operating at the increased pressure the controller 27 may be disconnected from valve positioner 28, the valve 12 opened wide, and the valve positioner 47 disconnected from controller 46 and connected to controller 27. Thus, as the air flow through venturi 16 varies the controller 27 will cause valve positioner 47 to vary the position of valve 39 to bring the air flow back to the preset value. In like manner in the embodiment of FIGURE 2 the controller for valve 77 may be used to position valve 92. Other adaptations and modifications may also be made without departing from the scope of the following claims.

We claim:

1. A control for supplying air from a plurality of blowers to a plurality of blast furnaces comprising a spill header, a conduit connecting each blower to said header, a conduit leading to each blast furnace, means for controlling flow of air directly to each of said last named conduits from at least one of said blowers, a valve in each of said last named conduits, means for positioning each of said valves to control air flow to the associated blast furnaces, a regulator for each blower, means connecting an impulse proportional to the pressure in said header to said regulator, and means connecting an impulse proportional to the air flow of each blower to its associated regulator, said regulator controlling the volume of air delivered by its associated blower.

2. A control for supplying air from a plurality of blowers to a plurality of variable loads comprising a plurality of conduits one associated with each load, one end of each conduit being connected to its associated load, a flow control valve in each of said conduits, means connecting the other end of each of said conduits to at least one of said blowers whereby air may pass directly from the blower to the load, a spill header, a conduit connecting each blower to said header, a regulator for each blower, means connecting an impulse proportional to the pressure in said header to said regulator, means connecting an impulse proportional to the air flow of each blower to its associated regulator, said regulator controlling the volume of air delivered by its associated blower, a valve in at least one of said last named conduits, and means for positioning said last named valve when the air pressure from its associated blower exceeds a set amount.

3. A control for supplying air from a plurality of blowers to a plurality of variable loads comprising a plurality of conduits one associated with each load, one end of each conduit being connected to its associated load, a flow control valve in each of said conduits, means connecting the other end of each of said conduits to at least one of said blowers whereby air may pass directly from the blower to the load, a spill header, a conduit connecting each blower to said header, a regulator for each blower, a pressure controller connected to said header, means connecting an impulse from said pressure controller to each of said regulators, means connecting an impulse proportional to the air flow of each blower to its associated regulator, said regulator controlling the volume of air delivered by its associated blower, a valve in each of said last named conduits, and means associated with each of said last named valves for positioning it when the air pressure from its associated blower exceeds a set amount.

4. A control for supplying air from a plurality of blowers to a plurality of variable loads comprising a spill header, a conduit connecting each blower to said header, a plurality of conduits one associated with each load, one end of each conduit being connected to its associated load, means connecting each of said first conduits to the other end of at least two of said second named conduits, means controlling flow of air in said last named means, a valve in each of said last named conduits, means for positioning each of said valves to maintain a desired air flow to its associated load, a regulator for each blower, means connecting an impulse proportional to the pressure in said header to said regulator, means connecting an impulse proportional to the air flow of each blower to its associated regulator, said regulator controlling the volume of air delivered by its associated blower, a valve in at least one of said first named conduits, a direct connection from the blower associated with said last mentioned conduit to the conduit leading to one of said loads, and means for positioning said last named valve when the air pressure from said last named blower exceeds a set amount.

5. A control for supplying air from two blowers to two variable loads comprising a spill header, a first conduit connecting one of said blowers to said header, a second conduit connecting the other of said blowers to said header, a third conduit having one end connected to the first of said loads, a first valve in said third conduit, a fourth conduit having one end connected to the second of said loads, a second valve in said fourth conduit, means connecting the other end of said third conduit to said first conduit, a third valve in said last named means, means connecting the other end of said third conduit to said second conduit, a fourth valve in said last named means, means connecting the other end of said fourth conduit to said second conduit, a fifth valve in said last named means, a sixth valve in said first conduit, a seventh valve in said second conduit, a regulator for each blower, means connecting an impulse proportional to the pressure in said header to said regulator, means connecting an impulse proportional to the air flow of each blower to its associated regulator, said regulator controlling the volume of air delivered by its associated blower.

6. A control according to claim 5 including means for positioning said sixth valve when the air pressure from said one of said blowers exceeds a set amount, and means for positioning said seventh valve when the air pressure from said other of said blowers exceeds a set amount.

7. A control according to claim 5 in which air is supplied to third and fourth variable loads and a third blower is provided, which includes a fifth conduit connecting the third blower to said header, an eighth valve in said fifth conduit, a sixth conduit having one end connected to the third of said loads, a ninth valve in said sixth conduit, a seventh conduit having one end connected to the fourth of said loads, a tenth valve in said seventh conduit, means connecting said second conduit to the other end of said seventh conduit, an eleventh valve in said last named means, means connecting said fifth conduit to the other end of said seventh conduit, a twelfth valve in said last named means, means connecting said fifth conduit to the other end of said sixth conduit, and a thirteenth valve in said last named means.

8. A control according to claim 7 including means for positioning said sixth valve when the air pressure from said one of said blowers exceeds a set amount, means for positioning said seventh valve when the air pressure from said other of said blowers exceeds a set amount, and means for positioning said eighth valve when the air pressure from said third of said blowers exceeds a set amount.

9. A control according to claim 8 in which each of the loads is a blast furnace.

10. A control according to claim 5 in which air is supplied to a third variable load and third and fourth blowers are provided, which includes a fifth conduit connecting the third of said blowers to said header, an eighth valve in said fifth conduit, a sixth conduit connecting the fourth of said blowers to said header, a ninth valve in said sixth conduit, a seventh conduit having one end connected to the third of said loads, a tenth valve in said seventh conduit, means connecting the other end of said seventh conduit to said fifth conduit, an eleventh valve in said last named means, means connecting the other end of said seventh conduit to said sixth conduit, a twelfth valve in said last named means, means connecting the other end of said fourth conduit to said fifth conduit, and a thirteenth valve in said last named means.

11. A control according to claim 10 including means for positioning said sixth valve when the air pressure from said one of said blowers exceeds a set amount, means for positioning said seventh valve when the air pressure from said other of said blowers exceeds a set amount, means for positioning said eighth valve when the air pressure from said third of said blowers exceeds a set amount, and means for positioning said ninth valve when the air pressure from said fourth of said blowers exceeds a set amount.

12. A control according to claim 11 in which each of the loads is a blast furnace.

References Cited in the file of this patent

UNITED STATES PATENTS

| | | |
|---|---|---|
| 1,662,851 | Ebner | Mar. 20, 1928 |
| 1,816,174 | Brown | July 28, 1931 |
| 2,224,295 | Hofer | Dec. 10, 1940 |
| 2,886,307 | Demmon | May 12, 1959 |
| 2,942,866 | Anderson | June 28, 1960 |

OTHER REFERENCES

Iron and Steel Engineer, vol. 28, No. 10, October, 1951, pp. 66–68 relied on.